United States Patent [19]

Hickey et al.

[11] Patent Number: 4,541,359

[45] Date of Patent: Sep. 17, 1985

[54] DEGRADABLE LITTER COVERING FOR USE IN THE BROODING AREA OF POULTRY HOUSES

[75] Inventors: David J. Hickey, Greensboro, N.C.; Kieran Devery, Columbus, Ind.

[73] Assignee: Kieffer Paper Mills, Inc., Brownstown, Ind.

[21] Appl. No.: 543,335

[22] Filed: Oct. 19, 1983

[51] Int. Cl.$^4$ .............................................. A01K 1/015
[52] U.S. Cl. .......................................................... 119/1
[58] Field of Search ....................................... 119/1, 28

[56] References Cited

U.S. PATENT DOCUMENTS

| | | | |
|---|---|---|---|
| 3,284,273 | 11/1966 | Prentice | 119/1 X |
| 3,776,188 | 12/1973 | Komakine | 119/1 |
| 4,129,097 | 12/1978 | Schwartzkopff et al. | 119/28 |
| 4,338,369 | 7/1982 | Foënard | 119/28 X |

FOREIGN PATENT DOCUMENTS

| | | | |
|---|---|---|---|
| 2248785 | 5/1975 | France | 119/1 |
| 2098448 | 11/1982 | United Kingdom | 119/1 |

*Primary Examiner*—Robert P. Swiatek
*Attorney, Agent, or Firm*—Woodard, Weikart, Embardt & Naughton

[57] ABSTRACT

A litter covering for placement over litter used in poultry houses. The litter covering comprises a sheet of paper which is gradually degradable into litter within 28 days. The paper is treated with ferrous sulphate hepta hydrate for ammonia control and is sufficiently water absorbent to facilitate moisture control in the poultry house. The paper has an indented design for cushioning and providing good footing for young chicks. The litter covering serves both as a physical barrier between the poultry and the litter and as a barrier of masking ammonia produced from used litter.

23 Claims, No Drawings

DEGRADABLE LITTER COVERING FOR USE IN THE BROODING AREA OF POULTRY HOUSES

BACKGROUND OF THE INVENTION

The present invention relates generally to the field of animal husbandry and, more particularly, to a means and method for extending the useful life of present litter materials used in poultry houses while significantly enhancing the health and growth rate of the poultry during the brooding period.

Present methods for commercially brooding broiler flocks involve the use of litter as opposed to growing the birds in cages or on a surface other than litter. This is the case because carcass quality, which is more important for broilers than egg producing hens or birds slaughtered for cut-up or boned chicken, is better when poultry flocks are brooded on litter. Traditionally, the main litter materials for broiler production have been wood shavings and sawdust, although a number of other materials, such as straw, corn cobs, composted garbage and shredded newspaper have also been used.

Ideally, it would be desirable for a litter material to meet the following principle requirements: (1) that it serves to effectively hide the feces from the birds; (2) that it is effective in absorbing moisture contained in the feces; (3) that it provides a good bedding which effectively insulates the birds from the harsh effects of the bare dirt, wood or concrete floor of the poultry house; (4) that it serves to provide some degree of ammonia control to limit the development of respiratory problems encountered most frequently in young chicks; and (5) that it not contain any significant number of pathogens harmful to poultry. Of course, in addition to these requirements, it is also desirable that the litter material be relatively inexpensive and economical to use and maintain.

In recent years, the cost of litter materials has risen rapidly, and shortages of popular litter materials, particularly wood shavings and sawdust, have been experienced. As a result, various research projects and tests have been undertaken in order to discover suitable substitutes to these more traditional litter materials. None of the products resulting from these efforts, however, is directed to a means and method for extending the useful life of existing litter materials.

Generally speaking, the use of sheet paper in or as a pet sanitary means is known. Thus, U.S. Pat. No. 4,250,834 to Cheselka discloses a pet sanitary facility comprising a stack of alternating sheets of newspaper and plastic on a horizontal support surface, such as a floor. Obviously, however, it is not contemplated that the animal will live in close confinement with large numbers of other animals on such a surface, such as would be required in the unique environment of a commercial poultry house. Butcher paper has been used as a litter covering in a poultry house environment, however, it is neither moisture absorbent or degradable in this environment, and thus requires removal from the poultry house after a couple of weeks. Further, since butcher paper is not water absorbent or degradable, health problems to young chicks occur as a result of water puddling on the paper, slipperiness of the paper, caking of droppings thereon, etc.

The following patents assertedly disclose various litter materials for use in poultry houses:

| U.S. Pat. No. | Inventor | Issued Date |
|---|---|---|
| 2,376,672 | Dreyling | May 22, 1945 |
| 2,351,686 | Kohl | June 20, 1944 |
| 3,029,783 | Sawyer, Jr. | Apr. 17, 1962 |
| 2,649,759 | Gibbs | Aug. 25, 1953 |
| 2,895,873 | Sawyer, Jr. | July 21, 1959 |
| 2,712,811 | Dowell, Jr. | July 12, 1955 |
| 4,306,516 | Currey | Dec. 22, 1981 |

Further, the following patents apparently disclose litter materials for use with animals, generally:

| | | |
|---|---|---|
| 3,765,371 | Fisher | Oct. 16, 1973 |
| 3,675,625 | Miller et al. | July 11, 1972 |
| 4,085,704 | Frazier | Apr. 25, 1978 |
| 4,157,696 | Carlberg | June 12, 1979 |
| 4,203,388 | Cortigene et al. | May 20, 1980 |
| 4,258,660 | Pris et al. | Mar. 31, 1981 |
| 4,341,180 | Cortigene et al. | July 27, 1982 |
| 4,263,873 | Christianson | Apr. 28, 1981 |
| 4,378,756 | Whiteman | Apr. 5, 1983 |
| 4,296,709 | Schulein, Jr. | Oct. 27, 1981 |
| 3,425,397 | Schulein et al. | Feb. 4, 1969 |
| 4,355,593 | Stapley | Oct. 26, 1982 |

In addition, U.S. Pat. No. 3,776,188 to Komakine and U.S. Pat. No. 3,113,072 to Goodhue, et al, are believed relevant for their disclosure of chemicals used in bird management, the Kimakine patent being particularly relevant for its disclosure of ferrous sulphate hepta hydrate for use as an ammonia control agent in poultry houses.

SUMMARY OF THE INVENTION

A litter covering for placement over litter used in poultry houses according to one embodiment of the present invention comprises one or more sheets of paper placed over any existing litter in at least the comfort zone in the brooding area of the poultry house. The strips are laid so as to effect initial separation of the poultry and the litter. The litter covering is further characterized as being designed and constructed to gradually degrade into litter over a predetermined time period which is less than the total period of confinement of poultry in the poultry house.

It is an object of the present invention to provide a litter covering for use in poultry houses which effectively insulates young chicks from used litter.

It is a further object of the present invention to provide a litter covering which serves to extend the useful life of present litter materials used in poultry houses.

It is a yet further object of the present invention to provide a litter covering which is sufficiently water absorbent to facilitate moisture control in poultry houses.

It is an additional object of the present invention to provide a litter covering which is degradable into litter during the brooding and grow out period of poultry within the poultry house.

Another object of the present invention is to provide a litter covering which masks and controls the production of ammonia in the poultry house.

Yet another object of the present invention is to provide a litter covering which provides good footing, especially for young chicks.

A still further object of the present invention is to provide a litter covering having all of the advantages mentioned above, yet which is also easy to install and economical to use.

Related objects and advantages of the present invention will become more apparent by reference to the following detailed description.

DESCRIPTION OF THE PREFERRED EMBODIMENT

For the purposes of promoting an understanding of the principles of the invention, reference will now be made to the preferred embodiment and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The litter covering of the present invention is comprised of a rolled sheet of paper made from recycled cellulose products. The sheet paper is designed to have a relatively high percentage composition of short fiber materials, the preferred fiber configuration being approximately 15% long fiber materials, such as corrugated paper products, and 85% short fiber materials, such as newsprint. The above fiber configuration has been found to facilitate a gradual degradation of the sheet paper in a poultry house environment in a manner fully described hereinafter, and yet allow persons to walk on the paper during initial installation without it tearing apart. Also, due to its content, thickness and consistency, the litter covering paper is sufficiently water absorbent to facilitate moisture control of the litter in a poultry house environment.

Varying the weight per cubic foot of the litter covering paper has been found to affect the rate which the litter covering paper degrades in a poultry house environment. Preferably, the litter covering paper has a weight in the range of 24–28 lbs. per 1000 square feet, 26 lbs. per 1000 square feet being the most satisfactory weight according to the most recent test. The paper may be formed in rolls or sheets, a 69 lb., 40" wide roll having a diameter of approximately 18".

The litter covering paper has an indented design formed by providing both sides of the paper with a multiplicity of contacting lines of globular protuberances, substantially identical in form and size, so that the protuberances on each side form hollow indentations on the opposite side. The purpose of this construction is to impart an increased cushioning and shock absorbing effect to the paper which serves to provide better footing and bedding for young chicks and also to increase its strength so that it may be walked on by a person during installation in the poultry house without easily tearing apart. A means and method for forming the paper in this manner is disclosed in U.S. Pat. Nos. 1,780,525 to Jacobsen and 2,042,470 to Kieffer, and is manufactured by Kieffer Paper Mills, Inc. of Brownstown, Ind. under the trademark "Shoksorb TM".

The litter covering paper is impregnated with 100 lbs. of ferrous sulphate hepta hydrate, in particular form, per ton of recycled paper. The ferrous sulphate hepta hydrate serves as an ammonia control agent to eliminate ammonia produced by zymosis of bird droppings in the poultry house.

The litter covering paper is preferably colored so that it has a light greenish appearance, one purpose of this being to compliment the lighting used in many poultry houses to create a more aesthetically pleasing environment for the chicks and thereby further enhance weight gain.

When used in a poultry house according to the method described hereinbelow, a litter covering paper having the fiber configuration described above begins to breakup within 12–14 days and is degradable into litter within 28 days, while affording a more healthful brooding environment during this initial period of confinement.

The preferred method of use of the litter covering paper of the present invention may be described as follows. The poultry house is divided into two or more sections in accordance with conventional half-house brooding methods and the used litter is leveled in order that the paper may be laid level and thereby prevent later openings from developing. It is to be understood that the poultry house may be of any conventionally known construction, and typically comprises an enclosure having a natural or artificial floor, a ceiling, one or more sidewalls, openings for ventilation, access and lighting, and having water and feed troughs therein. Artificial lighting and heat may also be provided in the area of the water and feed troughs to provide increased warmth in this area and thereby create a "comfort zone" which encourages chicks to congregate in the feeding area, resulting in increased weight gain. The poultry house should be closed from ventilation while the litter covering paper is being installed in order to prevent air currents from moving the paper. The litter covering paper is then laid down (preferably not more than three days prior to bird set) in parallel strips over the used litter in the entire first section of the poultry house. The strips should be laid beginning at the sides of the first section and ending in the center. This allows flexibility in placing the last runner. A portion of the floor corresponding to one strip should be left open while setting up the poultry house in order to provide a walk path until set up is completed. Adjacent strips are overlapped 4 to 5 inches in order to allow for shrinkage and thereby prevent early openings. If, for reasons of economy, it is not feasible or desirable to install the litter covering paper throughout the entire first section of the poultry house, the paper should be laid down at least over the comfort zone area thereof. If the poultry house has been cleaned of used litter from previous brooding flocks, it is preferable to not lay down the litter covering paper over new litter, since this may be detrimental to subsequent broiler weight gain rate.

After the litter covering paper has been laid down in the manner described and the setting up of the poultry house otherwise completed in the conventional manner, the poultry flock is introduced into the first section of the poultry house. Brooding takes place in the normal fashion, with the litter covering paper effectively shielding the young chicks from contact with the used litter. During the first several days of brooding, the litter covering paper serves as a masking agent preventing ammonia produced by zymosis of feces intermixed with the used litter from reaching the young chicks. After a couple of weeks the young chicks will have grown to a sufficient age that the ventilation techniques can be fully independent to reduce the ammonia level are above the level of the ammonia. By this time, the litter covering paper will have degraded into litter, thus eliminating the need to remove the paper from the poultry house a couple of weeks after installation, such as is the case with butcher paper. In order to prevent the litter covering paper from slicking over as a result of fecal buildup, it may be necessary to punch holes in the paper at regular intervals, such as 2 to 3 feet, in order to ensure that the paper will degrade into litter as desired.

The method just described is repeated for each succeeding flock introduced into the poultry house until such time as it becomes necessary to completely clean out the used litter in the poultry house, whereupon new litter is introduced for use by another flock without the litter covering paper. Of course, litter covering paper will again be laid down prior to the introduction of the next succeeding flock.

There are at least several advantages provided by the litter covering paper above described when used in accordance with the method of the present invention. Presently, it is a common management practice to clean the poultry house and remove the used litter at least once each year. The litter covering paper effectively extends the useful life of the used litter so that complete clean out of the poultry house need be performed less frequently. This results in a significant materials cost savings in litter as well as a labor savings for the commercial broiler producer. Further, using the litter covering paper in the manner described improves sanitation within the poultry house by providing a cleaner bedding during the initial period of confinement. This is important, because young chicks are especially susceptible to disease from various pathogens in the used litter, resulting in increased condemnations. Also, the litter covering paper serves to keep the drinkers and feeders litter free during this critical period.

One of the most notable advantages provided by the litter covering paper is its ability to mask the ammonia produced by zymosis of used litter in the poultry house. As mentioned earlier, ammonia production causes respiratory problems, particularly for young chicks, because their small size places them at a level where they are not above the heaviest concentrations of ammonia. As a result of the ability of the litter covering paper to effectively mask the ammonia, less ventilation is required and significant energy savings may be made during the heating seasons. Also, because the litter paper is impregnated with ferrous sulphate hepta hydrate, production of ammonia by new feces excreted on the litter covering paper is effectively controlled.

Another advantage of the litter covering paper is that it reduces litter and feces consumption by young chicks, thus increasing weight gain during the grow out period. This occurs due to the fact that the young chicks apparently acquire the habit of eating litter and feces during the brooding period, and the litter covering paper serves as a physical barrier preventing access to the litter and feces during this critical period. Footing for the young chicks is also improved and the increased cushioning afforded by the paper reduces injuries. The fact that the litter paper is highly water absorbent is a major benefit in facilitating moisture control, a considerable problem in poultry houses, especially where the litter is continually reused.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected.

What is claimed is:

1. In a poultry house, the improvement comprising as a litter covering to extend the useful life of litter in said poultry house, and improve health and sanitation therein, one or more sheets of paper placed to form a continuous flat sheet-like barrier over any existing litter in at least the comfort zone portion of the brooding area of said brooding house so as to effect initial separation between the poultry and the litter, said litter covering being designed and constructed to gradually degrade into litter over a predetermined time period which is less than the brooding and grow out period of poultry within said brooding house.

2. The litter covering of claim 1 wherein said paper is sufficiently water absorbent to facilitate moisture control in said poultry house.

3. The litter covering of claim 2 wherein said litter covering is chemically treated with an ammonia control agent.

4. The litter covering of claim 3 wherein said ammonia control agent is ferrous sulphate hepta hydrate.

5. The litter covering of claim 2 wherein said litter covering further having means, including a multiplicity of closely spaced and uniform protuberances on both sides of said paper, for providing improved footing for poultry walking on or otherwise contacting said paper.

6. The litter covering of claim 2 wherein said litter covering is gradually degradable into litter within 28 days.

7. The litter covering of claim 6 wherein said paper has a weight which is inclusively in a range from 24 to 28 pounds per 1000 sq. ft.

8. The litter covering of claim 2 wherein said paper has a cellulose fiber configuration which is composed of approximately 15% long fiber material and 85% short fiber material.

9. A method for brooding poultry on litter so as to extend the useful life of said litter and beneficially affect the health and growth rate of said poultry, comprising the steps of:
 (a) laying down one or more sheets of water absorbent litter covering paper to form a continuous flat sheet-like barrier over the litter in at least the comfort zone portion of the brooding area of a poultry house so as to mask the litter from said poultry; and
 (b) introducing a flock of poultry into said poultry house for brooding therein.

10. The method of claim 9 wherein the poultry house is divided into a plurality of sections, step (b) includes confining the flock into one of the sections for the first portion of the brooding period and step (a) includes laying down the paper upon the litter over the entire area in said one of the divided sections.

11. The method of claim 10 wherein step (a) further comprises repetitively laying down the litter covering paper over used litter prior to the introduction of each succeeding flock into said poultry house.

12. The method of claim 11 wherein said paper is laid down in strips with adjacent strips overlapping, the strips being laid beginning at the sides of the poultry house and proceeding towards the center thereof.

13. The method of claim 12 and further comprising the step of:
 (c) punching a plurality of holes in said paper so as to aid the poultry in degrading the paper into litter.

14. The method of claim 13 wherein said holes are punched at intervals from 2 to 3 feet approximately 7 days after the flock is introduced into the poultry house.

15. The method of claim 11 wherein step (a) is accomplished within three days prior to introduction of the flock into said poultry house.

16. A litter covering paper for use in a poultry house, comprising:
  a plurality of elongated strips of sheet paper designed and constructed to gradually degrade into litter over a predetermined time period which is less than the brooding period of poultry within said poultry house, said strips being arranged in lengthwise parallel fashion to form a continuous flat sheet-like barrier over any existing litter in at least the comfort zone portion of the brooding area of said poultry house, said strips being of sufficient width and thickness such that they are formed into one or more rolls that are unwound to form said barrier.

17. The litter covering paper of claim 16 wherein said sheet paper is sufficiently water absorbent to facilitate moisture control in said poultry house.

18. The litter covering paper of claim 17 wherein said sheet paper is chemically treated with an ammonia control agent.

19. The litter covering paper of claim 18 wherein said sheet paper further having means, including a multiplicity of closely spaced and uniform protuberances on both sides of said paper, for providing improved footing for poultry walking on or otherwise contacting said paper.

20. The litter covering paper of claim 19 wherein said sheet paper is gradually degradable into litter over a time period within 28 days.

21. The litter covering paper of claim 19 wherein said sheet paper has a weight which is approximately 26 pounds per 1000 sq. ft.

22. The litter covering paper of claim 18 wherein said ammonia control agent is ferrous sulphate hepta hydrate.

23. The litter covering paper of claim 17 wherein said sheet paer has a cellulose fiber configuration which is composed of approximately 15% long fiber material and 85% short fiber material.

* * * * *